United States Patent
Wodka et al.

(10) Patent No.: US 9,628,839 B1
(45) Date of Patent: Apr. 18, 2017

(54) GATEWAY MULTI-VIEW VIDEO STREAM PROCESSING FOR SECOND-SCREEN CONTENT OVERLAY

(71) Applicant: ARRIS Enterprises, Inc., Suwanee, GA (US)

(72) Inventors: Joseph F. Wodka, Hoffman Estates, IL (US); Jehan Wickramasuriya, St. Charles, IL (US); Venugopal Vasudevan, Palatine, IL (US)

(73) Assignee: ARRIS Enterprises, Inc., Suwanee, GA (US)

( * ) Notice: Subject to any disclaimer, the term of this patent is extended or adjusted under 35 U.S.C. 154(b) by 0 days.

(21) Appl. No.: 14/876,419

(22) Filed: Oct. 6, 2015

(51) Int. Cl.
| | |
|---|---|
| *H04N 7/173* | (2011.01) |
| *H04N 21/41* | (2011.01) |
| *H04N 19/597* | (2014.01) |
| *H04N 21/45* | (2011.01) |
| *H04N 21/4402* | (2011.01) |
| *H04N 21/434* | (2011.01) |

(52) U.S. Cl.
CPC ....... *H04N 21/4122* (2013.01); *H04N 19/597* (2014.11); *H04N 21/4348* (2013.01); *H04N 21/440236* (2013.01); *H04N 21/4532* (2013.01)

(58) Field of Classification Search
CPC ............... H04N 21/412; H04N 21/436; H04N 21/4122; H04N 21/42209
See application file for complete search history.

(56) References Cited

U.S. PATENT DOCUMENTS

| | | | |
|---|---|---|---|
| 6,144,375 A | * | 11/2000 | Jain .................... G06F 17/30017 345/420 |
| 8,051,452 B2 | * | 11/2011 | Arseneau .............. G06F 1/1626 725/37 |
| 8,468,227 B2 | | 6/2013 | Vasudevan et al. |
| 8,484,676 B1 | | 7/2013 | Narsimhan et al. |
| 8,683,067 B2 | * | 3/2014 | Herz .......................... G06T 3/00 348/43 |
| 8,943,425 B2 | | 1/2015 | Wickramasuriya et al. |
| 8,995,822 B2 | | 3/2015 | Vasudevan et al. |
| 9,106,979 B2 | | 8/2015 | Wickramasuriya et al. |

(Continued)

OTHER PUBLICATIONS

PCT International Search Report for PCT/US2016/055416, dated Jan. 11, 2017.

*Primary Examiner* — Fernando Alcon
(74) *Attorney, Agent, or Firm* — Stewart M. Wiener

(57) ABSTRACT

Particular embodiments use a multi-view coding (MVC) extension to provide second-screen content along with the first-screen content. In one embodiment, a head-end multiplexes the first-screen content with the second-screen content into a single content stream. The second-screen content is added to the video stream according to the MVC extension requirements. At the user end, such as at a gateway, instead of sending the first-screen content and second-screen content to the first-screen device, the gateway de-multiplexes the first-screen content and the second-screen content. The gateway can then send the first-screen content to the first-screen device while caching the second-screen content. When the gateway determines that the second-screen content should be displayed on the second-screen device, the gateway can send the second-screen content to the second-screen device for display on the second-screen of the second-screen device.

20 Claims, 6 Drawing Sheets

(56) References Cited

U.S. PATENT DOCUMENTS

| | | | |
|---|---|---|---|
| 2008/0066123 A1* | 3/2008 | Igoe | H04L 12/2809 455/41.3 |
| 2008/0240010 A1 | 10/2008 | Vasudevan et al. | |
| 2008/0320041 A1 | 12/2008 | Engelsma et al. | |
| 2009/0009605 A1* | 1/2009 | Ortiz | H04N 5/232 348/157 |
| 2009/0172745 A1 | 7/2009 | Horozov et al. | |
| 2009/0241155 A1 | 9/2009 | Narasimhan et al. | |
| 2009/0288120 A1 | 11/2009 | Vasudevan et al. | |
| 2010/0115596 A1 | 5/2010 | Horozov et al. | |
| 2010/0121763 A1 | 5/2010 | Vasudevan et al. | |
| 2010/0180297 A1 | 7/2010 | Levine et al. | |
| 2010/0293032 A1 | 11/2010 | Engelsma et al. | |
| 2010/0316122 A1* | 12/2010 | Chen | H04N 21/23432 375/240.12 |
| 2011/0159929 A1* | 6/2011 | Karaoguz | H04N 13/0404 455/566 |
| 2011/0289532 A1 | 11/2011 | Yu et al. | |
| 2011/0299546 A1* | 12/2011 | Prodan | G06Q 20/10 370/401 |
| 2011/0321114 A1* | 12/2011 | Newell | H04N 21/23431 725/146 |
| 2012/0096505 A1 | 4/2012 | Merlin | |
| 2012/0116869 A1 | 5/2012 | Vasudevan et al. | |
| 2012/0204207 A1 | 8/2012 | Clapper | |
| 2012/0291073 A1* | 11/2012 | Friedman | H04N 5/44582 725/62 |
| 2012/0311043 A1* | 12/2012 | Chen | H04N 21/23406 709/204 |
| 2013/0007793 A1* | 1/2013 | Anthru | H04N 5/4403 725/14 |
| 2013/0031581 A1 | 1/2013 | Narasimhan et al. | |
| 2013/0074139 A1 | 3/2013 | Cope et al. | |
| 2013/0097649 A1* | 4/2013 | Son | H04N 7/181 725/116 |
| 2013/0132998 A1 | 5/2013 | Narasimhan et al. | |
| 2013/0144709 A1 | 6/2013 | Narasimhan et al. | |
| 2013/0159876 A1 | 6/2013 | Narasimhan et al. | |
| 2013/0160036 A1 | 6/2013 | Narasimhan et al. | |
| 2013/0173765 A1* | 7/2013 | Korbecki | H04N 21/42209 709/221 |
| 2013/0194310 A1 | 8/2013 | Vasudevan et al. | |
| 2013/0198642 A1* | 8/2013 | Carney | G06F 3/0484 715/738 |
| 2013/0243392 A1 | 9/2013 | Vasudevan et al. | |
| 2013/0246168 A1 | 9/2013 | Wickramasuriya et al. | |
| 2013/0246447 A1 | 9/2013 | Wickramasuriya et al. | |
| 2013/0262536 A1* | 10/2013 | Avrahami | G06F 17/30194 707/827 |
| 2013/0347018 A1* | 12/2013 | Limp | H04N 21/4826 725/19 |
| 2014/0028797 A1* | 1/2014 | Hattori | H04N 13/0029 348/43 |
| 2014/0051505 A1 | 2/2014 | Wickramasuriya et al. | |
| 2014/0053221 A1 | 2/2014 | Sirpal et al. | |
| 2014/0053223 A1 | 2/2014 | Vorobyov et al. | |
| 2014/0074923 A1 | 3/2014 | Vasudevan et al. | |
| 2014/0075471 A1* | 3/2014 | Antonets | H04N 21/4316 725/32 |
| 2014/0089967 A1 | 3/2014 | Mandalia et al. | |
| 2014/0143043 A1 | 5/2014 | Wickramasuriya et al. | |
| 2014/0143803 A1 | 5/2014 | Narsimhan et al. | |
| 2014/0165111 A1* | 6/2014 | Ko | H04N 21/242 725/74 |
| 2014/0282642 A1 | 9/2014 | Needham et al. | |
| 2015/0022721 A1* | 1/2015 | Agarwal | H04N 21/4316 348/564 |
| 2015/0067749 A1 | 3/2015 | Huber | |
| 2015/0073921 A1 | 3/2015 | Vasudevan et al. | |
| 2015/0073924 A1 | 3/2015 | Wickramasuriya et al. | |
| 2015/0121432 A1* | 4/2015 | Pandey | H04N 21/25891 725/78 |
| 2015/0149922 A1 | 5/2015 | Wickramasuriya et al. | |
| 2015/0222843 A1* | 8/2015 | Avrahami | H04N 21/4122 386/219 |
| 2015/0245081 A1* | 8/2015 | Cook | H04N 21/2407 725/81 |
| 2015/0281787 A1* | 10/2015 | Jayaram | H04N 21/435 725/59 |
| 2015/0319509 A1* | 11/2015 | Huang | H04N 21/8405 725/53 |
| 2015/0331954 A1 | 11/2015 | Wickramasuriya et al. | |
| 2016/0092939 A1* | 3/2016 | Beattie, Jr. | H04L 65/605 705/14.66 |

* cited by examiner

GATEWAY MULTI-VIEW VIDEO STREAM PROCESSING FOR SECOND-SCREEN CONTENT OVERLAY

BACKGROUND

Multi-screen solutions display second-screen content on second-screen devices while a user watches first-screen content (e.g., a television show) on a first-screen device (e.g., television). Second-screen applications allow users to interact with their second-screen devices while viewing first-screen content on first-screen devices. In one example, a user may watch a television show on a television. Then, the user can use his/her second-screen device to access second-screen content, such as supplemental content for the television show or advertisements, while watching the television show. In one example, the first-screen content may be delivered via a cable television network to the television. The user may then use a content source's application on the second-screen device to access the second-screen content via another communication medium, such as the Internet. For example, while watching the television show on a television network, the user may open the television network's application to request the second-screen content via the Internet.

While second-screen use has increased, the overall uptake has been limited. Some issues may be limiting the uptake, such as the user typically has to download an application to view the second-screen content. In some cases, for each different content source, the user needs to download a different application to view the second-screen content. For example, a first television network has a first application and a second television network has a second application. Also, there may be problems with the synchronization between the first-screen content and the second-screen content. For example, the second-screen content should be output in coordination with the first-screen content. However, there may be latency in retrieving content for the second-screen in response to the first-screen event, and also there may be latency when the second-screen device has to connect via a different communication network to receive the second-screen content from the communication network delivering the first-screen content. The latency may cause problems with some content, such as in real-time programs (e.g., sports), where latency in the synchronization is not acceptable.

DETAILED DESCRIPTION

Described herein are techniques for a second-screen delivery system using multi-view coding extensions. In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

Particular embodiments provide a second-screen experience for users on a second-screen device. A system uses multi-stream capabilities designed for delivering multi-view content to a first-screen device. However, the system uses the multi-stream capabilities to enable the second-screen experience. For example, encoding standards have incorporated multi-stream capabilities. The multi-stream capabilities allow a system to deliver multiple video streams to a single source. Typically, a multi-view coding (MVC) extension is used to provide multiple views to a first-screen device. For example, a three dimensional (3D) movie includes a main video stream and another stream for a second view. The main video stream and second view are sent to the first-screen device, which combines the second view with the main video stream to create the 3D picture on the first-screen device. The second view is encoded into a single stream with the main video stream using the MVC extension.

Particular embodiments use the MVC extension to provide second-screen content along with the first-screen content. In one embodiment, a head-end multiplexes the first-screen content with the second-screen content into a single content stream. The second-screen content is added to the video stream according to the MVC extension requirements. At the user end, such as at a gateway, instead of sending the first-screen content and second-screen content to the first-screen device, the gateway de-multiplexes the first-screen content and the second-screen content. The gateway can then send the first-screen content to the first-screen device while caching the second-screen content. When the gateway determines that the second-screen content should be displayed on the second-screen device, the gateway can send the second-screen content to the second-screen device for display on the second-screen of the second-screen device.

Figure 1:
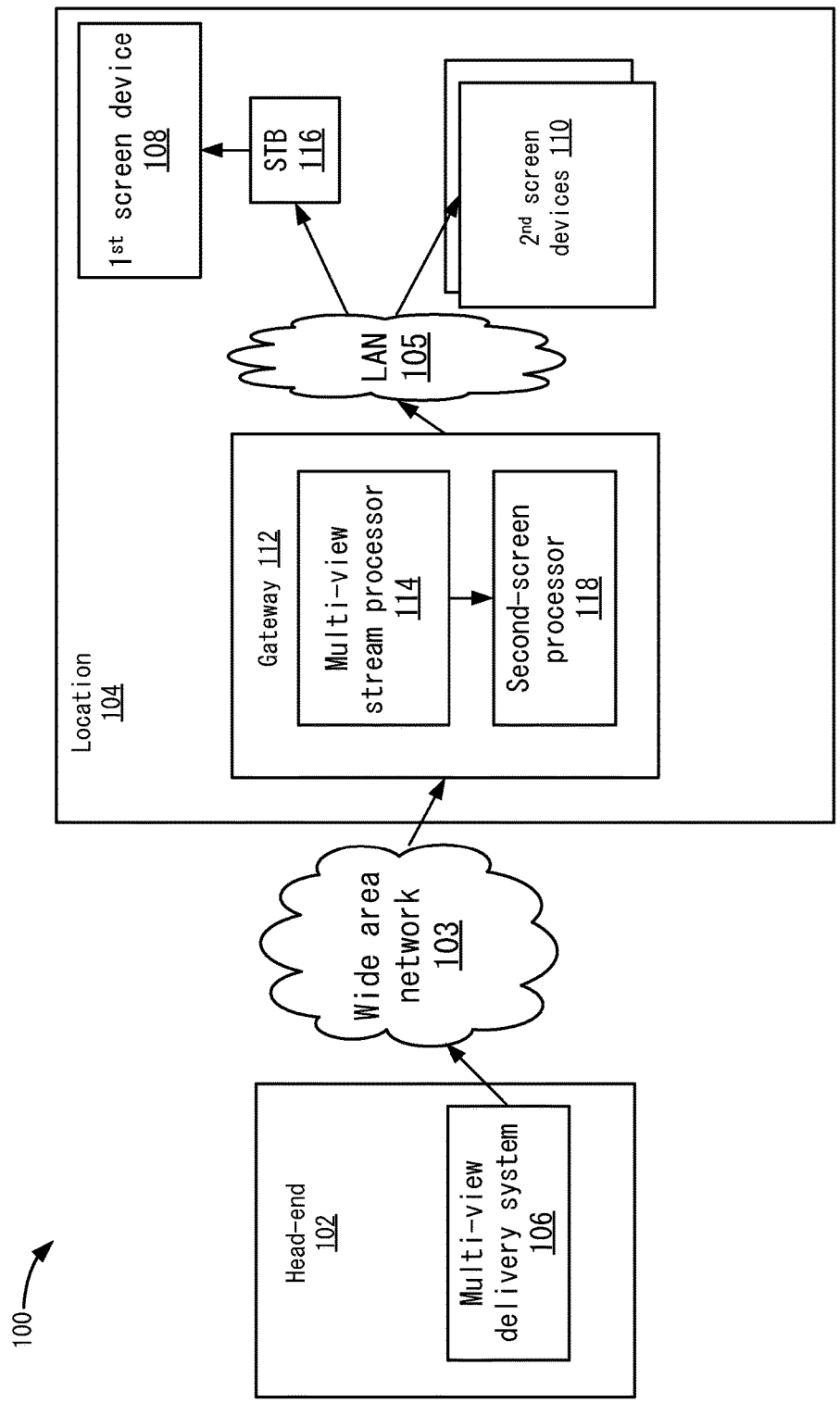
FIG. 1 depicts a system for delivering first-screen content and second-screen content using multi-view coding (MVC) extensions according to one embodiment.

FIG. 1 depicts a system 100 for delivering first-screen content and second-screen content using MVC extensions according to one embodiment. System 100 includes a head-end 102 and customer premise location 104. Head-end 102 may be servicing multiple customer premise locations 104 (not shown). Each customer premise location 104 may be offered a personalized second-screen experience using methods described herein.

Head-end 102 may deliver first-screen content to customer premise location 104. In one embodiment, head-end 102 is part of a cable television network that delivers video content for different television networks via broadcast and also on demand. The first-screen content may be delivered via the cable television network using a variety of communication protocols. Different communication protocols schemes may be used, such as quadrature amplitude modulation (QAM) or Internet Protocol, to deliver the video content. Although a head-end and cable network is described, other types of networks that can deliver content using the MVC extension can be used.

In one embodiment, a multi-view delivery system 106 includes multiple computing devices that send first-screen content to customer premise location 104. Customer premise location 104 may include a gateway 112 that is a device that interfaces with an outside wide area network 103 (e.g., cable network and/or the Internet) and a local area network 105 within location 104. A first-screen ($1^{st}$ screen) device 108 and a set of second-screen devices 108 are connected to gateway 112 via local area network 105. The first-screen device 108 may be considered a primary screen, such as a television, that a user is primarily watching. For example, a user may watch a television show on first-screen device 108. Second-screen ($2^{nd}$ screen) devices 110 may be secondary screens in which supplemental or second-screen content can be viewed while a user is watching first-screen device 108. Examples of second-screen devices 110 include mobile devices, such as smartphones, tablets, and laptop computers.

Multi-view delivery system 106 may deliver the first-screen content destined for first-screen device 108 for display on a first-screen. Also, multi-view delivery system 106 may deliver second-screen content destined for one or more of second-screen devices 110. The second-screen content may be considered supplemental content to the first-screen content. For example, the second-screen content may include advertisements, additional information for first-screen content, promotion coupons or offers, and other types of information.

An encoding standard, such as H.264, high-efficiency video coding (HEVC), or other similar protocols, allow multi-views to be sent in single video stream. For example, an extension of H.264/motion pictures experts group (MPEG)-4, advanced video coding (AVC) standard, the joint video teams of the international telecommunications union (ITU)-T video coding experts group (VCEG), and the international standard (ISO)/international electro-technical commission (IEC) moving picture experts group (MPEG) standardized an extension of a transcoder. The extension refers to multi-view video coding, which is amendment 4 to the H.264/AVC standard. The extension states multiple video streams can be multiplexed via different P frames into a single stream. Other extensions may be used, such as supplemental enhancement information (SEI), which may be used in the standard to allow metadata to be sent with the first-screen content, and also other alternative approaches to providing multi-view capabilities.

One common use of the extension is to provide at least two multi-view video streams to allow a single-screen to experience three-dimensional video. However, particular embodiments may leverage the extension to provide second-screen content. In this case, multi-view delivery system 106 is enhanced to enable delivery of multi-view streams that include first-screen content and second-screen content.

Also, gateway 112 is specially configured to process the second-screen content that is sent using the MVC extension. For example, conventionally, a gateway would have received the two multi-view streams using the MVC extension in a single content stream. Then, the gateway would have sent both multi-view streams to only first-screen device 108 (e.g., not to any second-screen devices). This is because the MVC extension is meant to provide multi-views on a single device. However, gateway 112 uses a multi-view stream processor 114 to de-multiplex the first-screen content and the second-screen content that is included in a content stream from multi-view delivery system 106. Multi-view stream processor 114 may analyze the content stream to determine where to send the different streams. In some embodiments, the content streams may be intended entirely for first-screen device 108, such as when a 3D movie is being watched and the multi-view content includes the additional view. In this case, multi-view stream processor 114 may send both the first-screen content and the multi-view content to first-screen device 108. For example, both of the multi-view streams are merged again and encoded using an encoder, and then sent to first-screen device 108.

When using the MVC extension to enable the second-screen environment, encoder 308 re-encodes the first-screen content and then sends the first-screen content to first-screen device 108, which can then display the first-screen content. In one embodiment, a set top box (STB) 116 may receive the first-screen content, decode the content, and then display the content on first-screen device 108. However, instead of sending the multi-view content to first-screen device 108, multi-view stream processor 114 may determine whether the multi-view stream is for the first-screen or the second-screen. The determination may be made based on metadata associated with the multi-view stream that may indicate whether or not the multi-view content is first-screen content or second-screen content.

When the multi-view content is second-screen content, a second-screen processor 118 may then send the second-screen content to second-screen device 110 at the appropriate time. For example, multi-view stream processor 114 may first cache the second-screen content. Then, at the appropriate time, second-screen processor 118 synchronizes the display of the second-screen content with first-screen content being displayed on first-screen device 108. For example, an encoder encodes the second-screen content for sending to second-screen devices 110. In other embodiments, a user may request the second-screen content when desired. Other methods of providing the second-screen content may be appreciated and will be described in more detail below.

Accordingly, the MVC extension is used to send both the first-screen content and the second-screen content in multiple views in a content stream. An intelligent gateway 112 is used to parse the content stream to separate out the first-screen content and the second-screen content based on metadata. The second-screen content can be sent to second-screen devices 110 without being sent to first-screen device 108. Particular embodiments use gateway 112 because gateway 112 sits between headend 102 and first screen devices 108/second-screen devices 110. Gateway 112 has the processing power to decode the stream and determine whether one view is for the second-screen devices. Gateway 112 can then re-encode the streams and send separate content streams for the first-screen content and the second-screen content to the appropriate destinations. This allows first screen devices 108/second-screen devices 110 to not have to be changed to handle MVC extensions for providing second-screen content. For example, either first screen device 108 or second-screen devices 110 would have had to receive the single stream with both the first-screen content and the second-stream content and determine how to process the second-screen content. Gateway 112 sits naturally in between first screen devices 108/second-screen devices 110, and can determine how to send the second-screen content.

Head-End Encoding

Figure 2:
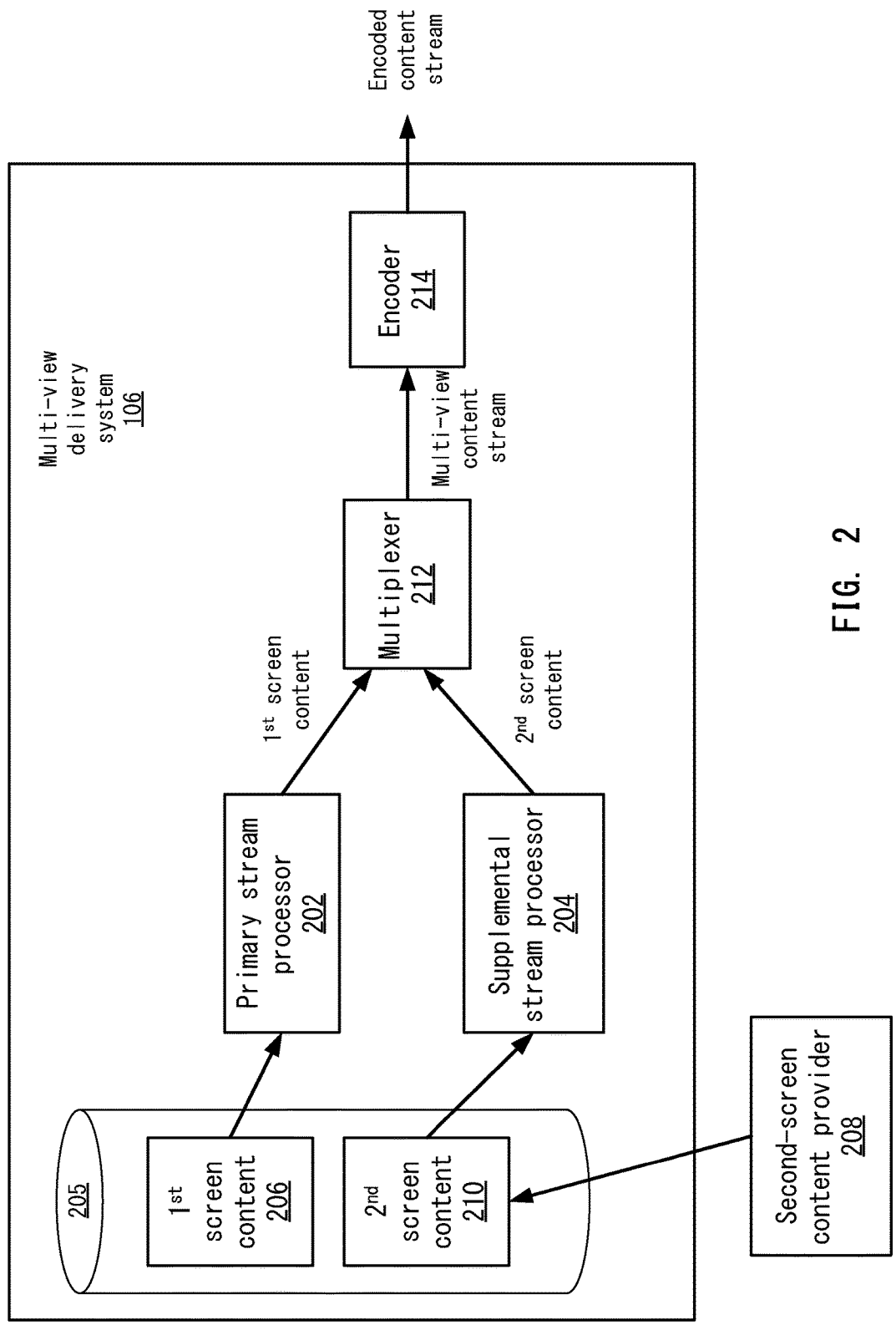
FIG. 2 depicts a more detailed example of a head-end according to one embodiment.

As mentioned above, head-end 102 may multiplex the first-screen content and the second-screen content together into a content stream. FIG. 2 depicts a more detailed example of head-end 102 according to one embodiment. A primary stream processor 202 and a supplemental stream processor 204 may determine the first-screen content and the second-screen content, respectively, to add to the single content stream. Although only content stream is described, it will be recognized that multiple content streams may be processed, such as content streams for multiple television broadcasts. Any number of the broadcasts may include second-screen content.

Primary stream processor 202 may receive the first-screen content 206 may be received from other content sources in real time via satellite or other networks. In other embodiments, first-screen content may retrieve the first-screen content from storage 205, which may be cache memory or other types of long term storage. Although one content stream is described, primary stream processor 202 may be sending multiple content streams for multiple television channels to locations 104. Some of the television channels may have related second-screen content, and some may not.

Supplemental stream processor 204 may receive second-screen content from a second-screen content provider 208. Second-screen content provider 208 may include an advertiser, a service provider, a retailer, or even a cable television provider. Also, second-screen content provider 208 may be the same content source that provided the first-screen content. In one embodiment, second-screen content provider 208 may provide second-screen content to head-end 102, which is stored in storage 205 at 210.

Second-screen content provider 208 can now target specific user devices, and also service providers can provide enhancements to the first-screen content. For example a service provider could provide the player statistics for a sporting event video stream. Supplemental stream processor 204 may then determine which second-screen content is appropriate to send with the first-screen content. In one example, supplemental stream processor 204 determines second-screen content targeted to a user of second-screen device 110 or first-screen device 108. Once determining the second-screen content, supplemental stream processor 204 sends the second-screen content to a multiplexer 212.

Multiplexer 212 receives the first-screen content and the second-screen content, and multiplexes them together into a single multi-view content stream. Multiplexer 212 may multiplex the first-screen content and the second-screen content based on the MVC extension. Also, metadata to identify the second-screen content as being "second-screen content" or for a specific second-screen device 110 may be added to the content stream. The metadata may be needed because the MVC extension is being used for a purpose other than sending multi-views to a single device. The metadata allows gateway 112 to determine when second-screen content is included in the single content stream. Then, encoder 214 may encode the first-screen content and the second-screen content together into an encoded content stream. In one embodiment, encoder 214 encodes the second-screen content using the MVC extension. In this case, the second-screen content is sent as a multi-view stream with the first-screen content. Encoder 214 can then send the single encoded content stream through network 103 to customer premise location 104.

Gateway De-Multiplexing

Figure 3:
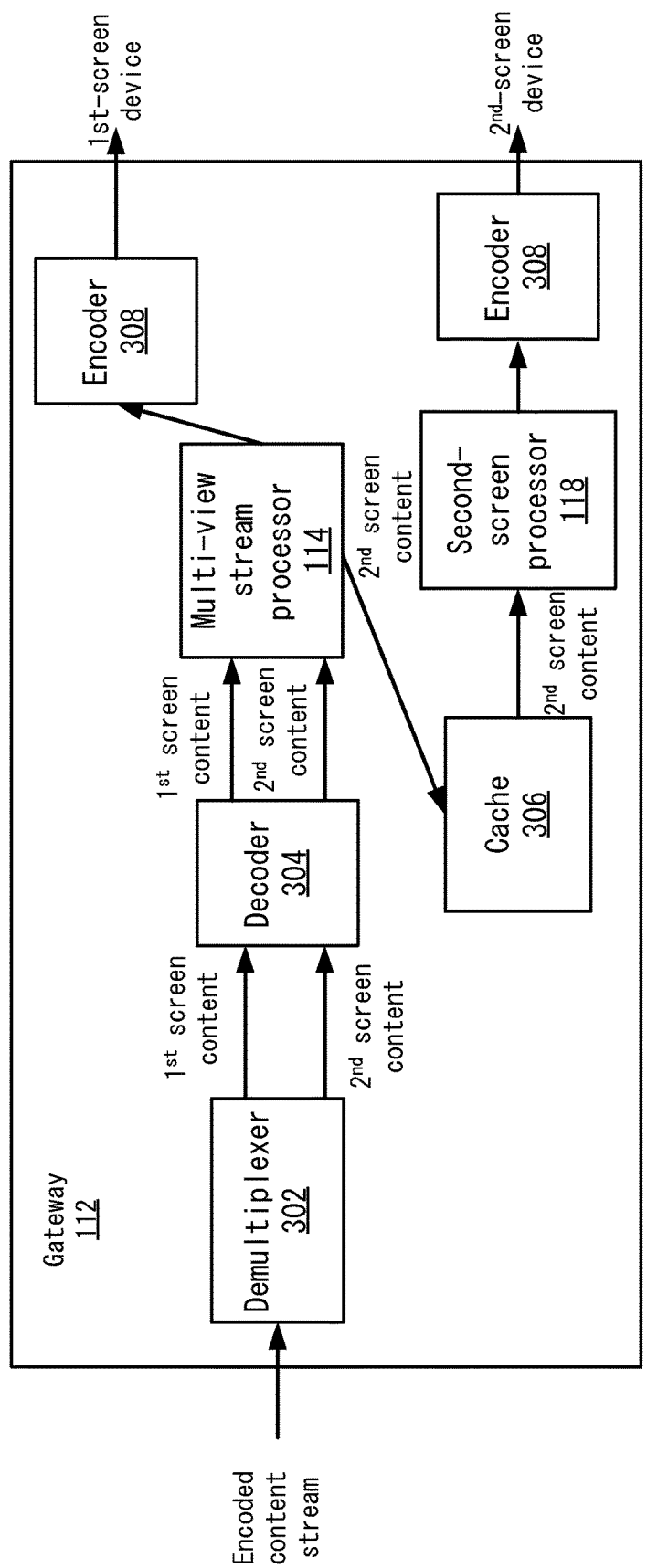
FIG. 3 depicts a more detailed example of a gateway for de-multiplexing the content stream according to one embodiment.

FIG. 3 depicts a more detailed example of gateway 112 for de-multiplexing the content stream according to one embodiment. Gateway 112 receives the encoded content stream that includes the multiplexed the first-screen content and the second-screen content. Because of the multiplexing, a de-multiplexer 302 de-multiplexes the content stream to separate the multi-view streams. A decoder 304 can then decode the first-screen content and the second-screen content.

Multi-view stream processor 114 can then determine whether the multi-view streams include first-screen content and the second-screen content, or are conventional multi-view streams. For example, depending on the metadata associated with the second-screen content, multi-view stream processor 114 may prepare the second-screen content for forwarding to second-screen device 110. In other embodiments, the second-screen content may actually be meant for first-screen device 108 (in this case, it would not be referred to as second-screen content and is actually multi-view content being traditionally used). If the content stream included traditional multi-view content, then the first-screen content and the second-screen content may be recombined into a single stream, and then an encoder 308 re-encodes the single stream, which is sent to first-screen device 108.

When the content stream includes first-screen content and the second-screen content, multi-view stream processor 114 determines where to send the first-screen content and the second-screen content. For example, multi-view stream processor 114 sends the first-screen content to set top box 116 (encoded by encoder 308). Then, multi-view stream processor 114 determines where to send the second-screen content. In this embodiment, multi-view stream processor 114 stores the second-screen content in cache memory 306. Although cache memory is described, any type of storage may be used.

Once the second-screen content has been stored in cache memory 306, second-screen processor 118 may determine when and where to send the second-screen content to second-screen device 110. Encoder 308 (this may be the same encoder used to encode the single stream with multi-views or a different encoder) may encode the second-screen content into a stream. This stream is different as it only includes second-screen content and is not multiplexed with first-screen content. This type of content stream may be in a format that second-screen device 110 is configured to process (that is, second-screen device 110 does not have to de-multiplex a content stream with both first-screen content and second-screen content). Encoder 308 then sends the second-screen content to second-screen device 110. It should be noted that encoding may be performed at any time before delivery to second-screen device 110.

Second-Screen Delivery

Figure 4:
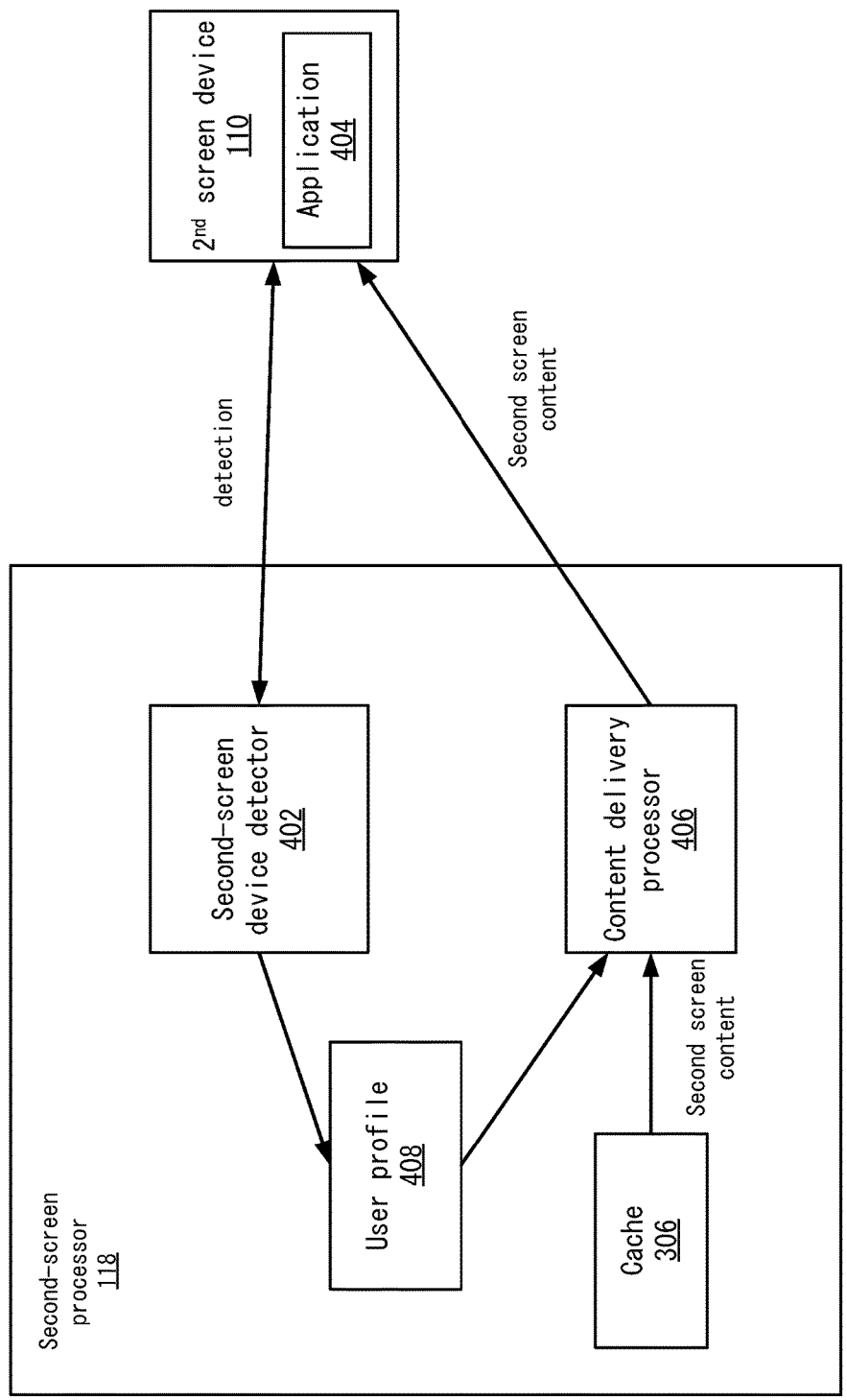
FIG. 4 depicts a more detailed example of a second-screen processor according to one embodiment.

FIG. 4 depicts a more detailed example, of second-screen processor 118 according to one embodiment. Second-screen processor 118 may deliver the second-screen content differently. For example, second-screen processor 118 may forward all second-screen content to second-screen device 110 with metadata that is selected based on how and when to display the second-screen content. Or, second-screen processor 118 may detect different events (e.g., in the first screen content) and send the second-screen content in a synchronized manner.

Second-screen processor 118 also may determine which second-screen device 110 is connected to gateway 112 and determine which second-screen device 110 should be the destination for the second-screen content. For example, second-screen processor 118 maintains a list of devices within location 104 that are associated with a user or users. This information may be determined via a user profile 408 for the user (or multiple user profiles for multiple users). The user profile information may be found in a subscription profile (when using an application supported by the MSO) or provided by a user. Also, second-screen processor 118 may include a second-screen device detector 402 to detect which second-screen devices 110 are active in customer premise location 104. Second-screen device detector 402 may also track which applications 404 are being used by second-screen devices 110.

In detecting which second-screen devices 110 are active, second-screen device detector 402 may message with second-screen devices 110 to determine which second-screen devices 110 are active and in what location. This may involve sending a message to application 404 and having a user confirm the activity and location. Also, second-screen device detector 402 may use fingerprinting or application detection methods may be used to maintain the list of devices. For example, second-screen device detector 402 may activate a microphone of second-screen device 110 to detect the audio being output in the location of second-screen device 110. Then, second-screen device 110 may determine a fingerprint of the first-screen content being output by first-screen device 108. In one example, a television may be outputting a television show, and second-screen device 110 may take a fingerprint of the audio within a range of second-screen device 110. Second-screen device 110 or second-screen device detector 402 (or a back-end device) can then determine that a user is watching the television show when the fingerprint matches a fingerprint from the television show. Further, second-screen device detector 402 may detect which application the user is using by intercepting transfers between the application and a wide area network, such as the Internet.

As discussed above, cache 306 buffers the second-screen content. Also, metadata about the second-screen data may be stored in cache 306. The metadata may include information that can be used to determine when the second-screen content should be output to second-screen device 110.

Then, a content delivery processor 406 determines when second-screen content should be provided to second-screen device 110. Content delivery processor 406 may monitor the first-screen content being sent and metadata for the second-screen content in cache 306. For example, when a first-screen device renderer requests a change in the content view via a channel change, content delivery processor 406 records the change such that content delivery processor 406 knows the channel first-screen device 108 is watching. Then, content delivery processor 406 can retrieve second-screen content for second-screen device 110 appropriately. For example, content delivery processor 406 may retrieve second-screen content for the current channel at a time defined by the metadata for the second-screen content. This synchronizes the second-screen content with the first-screen content.

Content delivery processor 406 may use user profile 408 for users that second-screen device detector 402 built to personalize the second-screen content delivery. The user profile may store personal information for the user, such as user preferences for second-screen content, such as what types of advertisements the user likes to view. Content delivery processor 406 may then determine which second-screen content to provide to second-screen application 404.

Content delivery processor 406 may sit within a protocol stack on gateway 112 to allow it to disseminate second-screen content to various second-screen devices 110. A software development kit can be used by a second-screen application 404 to allow interaction with content delivery processor 406 in gateway 112 to receive second-screen content. For example, second-screen applications 404 can subscribe to and access different capabilities provided by gateway 112. For example, the software development kit allows second-screen applications 404 to interface with content delivery processor 406 and request specific second-screen sub-streams based on provided parameters. In other embodiments, content delivery processor 406 may automatically determine which second-screen content to send based on the user profile.

Because gateway 112 is context aware via the second-screen device detection, gateway 112 can use the user profile for a user and disseminate the appropriate second-screen content to the second-screen devices 110. For example, when two second-screen devices 110 exist within customer premise location 104 and are active while first-screen device 108 is active, one second-screen device 110 may be targeted with first second-screen content based on the user profile and another second-screen device may be provided with general second-screen content that is not targeted. In one example, when watching a cooking show on the first-screen, a first second-screen device 108 may receive general coupons, and a second second-screen device may receive personalized recipes.

In another embodiment, the second-screen content may include sign language-enabled broadcasts in which sign language can be displayed on second-screen devices 110. The standard method for hearing-impaired services is to provide closed caption or in some broadcasts to set up a picture-in-a-picture (PIP) where a sign language source may be in the corner of the first-screen device display screen while the first-screen content is displayed in the remainder of the first-screen device display screen. This may not be ideal for viewers that may be in the same household. For example, it may either disrupt the viewing experience for users that do not need the sign-language view or overlay too much of the sign-language view over the first-screen broadcast. Also, the PIP window may be too small to view the sign language. Using particular embodiments, the first-screen content may include the main broadcast program and the second-screen content may include sign language information that is associated with the first-screen content. Gateway 112 may track second-screen devices 110 that are active and determine that a user who is hearing-impaired is watching the first-screen content via any detection process. Gateway 112 may then determine that the sign language information should be sent to this second-screen device. Then, the user can watch the sign-language display on his/her own second-screen device 110 without interrupting the television show. Also, this can be enhanced to allow the user to design the elements of how the sign language view and the first-screen content view should be laid out and cast back to the primary screen renderer. For example, a user can segment the first-screen content and the second-screen content as desired.

The second-screen content can be provided without the need for the second-screen application to use any first-screen content detection, such as fingerprint detection. Rather, gateway 112 has access to the first-screen content and can perform this detection itself. Further, second-screen device 110 does not need any over-the-top capabilities as the second-screen content is sent with the first-screen content. This may also help synchronization as the second-screen content arrives with the first-screen content and experiences the same latency.

Gateway 112 also allows for new application capabilities that go beyond simply overlaying content on second-screen devices 110 based on first-screen content contacts. For example, extended features not only at the content source, but also by application developers may be used. For example, a cooking show can produce multi-stream views that include the main program, detailed recipe instructions, and ingredient manufacturer coupons. Hence, a second-screen application designer can create different overlays that allow the user to view the recipe details and store them on their home recipe file while previewing the manufacturer coupons and storing the coupons in user-specific logs at the same time as watching the first-screen content.

In one example, a user is viewing a channel on first-screen device 108 while accessing application 404 on second-screen device 110. When the user tunes to the channel to view the first-screen content, content delivery processor 406 detects the user is watching certain first-screen content. Then, content delivery processor 406 may send second-screen content to application 404 including metadata for when and how the second-screen content should be presented to the user. The second-screen content may include time-based synchronized advertisements to the first-screen content, promotion offers, such as coupons, or supplemental content, such as detailed episode instructions in the form of additional video. The episode-related material may be cooking instructions or detailed auto inspection information that relates to the first-screen content being viewed.

Accordingly, second-screen application 404 can display second-screen content related to the first-screen content without the need to have a connection to an external source through a wide area network, such as the Internet or an over-the-top connection, different from the connection being used by first-screen device 108. That is, the second-screen content is received via the same communication network and content stream as the first-screen content. Further, second-screen device 110 does not need to rely on external technologies to determine what the user is watching and to retrieve related material. Gateway 112 can detect the existing second-screen devices 110 being used and through context build user profile information along with information sent from second-screen applications 404 to determine the appropriate second-screen content to provide to users.

Head-End Enhancements to Personalize User Experience

In some embodiments, gateway 112 may detect which second-screen devices 110 are active. Then, gateway 112 may consult a user profile to determine which second-screen content may be of interest to this user using this second-screen device 110. For example, if a mobile telephone that is associated with a user #1 is active, and this user likes cooking shows, then gateway 112 may send a message to head-end 102 indicating that user #1 is active and likes cooking shows.

When user #1 requests a cooking show, head-end 102 may determine that recipe information should be sent to gateway 112 as second-screen content. In this case, head-end 102 may selectively provide second-screen content to different users. This may more efficiently use bandwidth as only second-screen content may be sent based on active second-screen devices 110 and only to users that may be interested in this second-screen content. Alternatively, second-screen content can be always sent with first-screen content.

Method Flow

Figure 5:
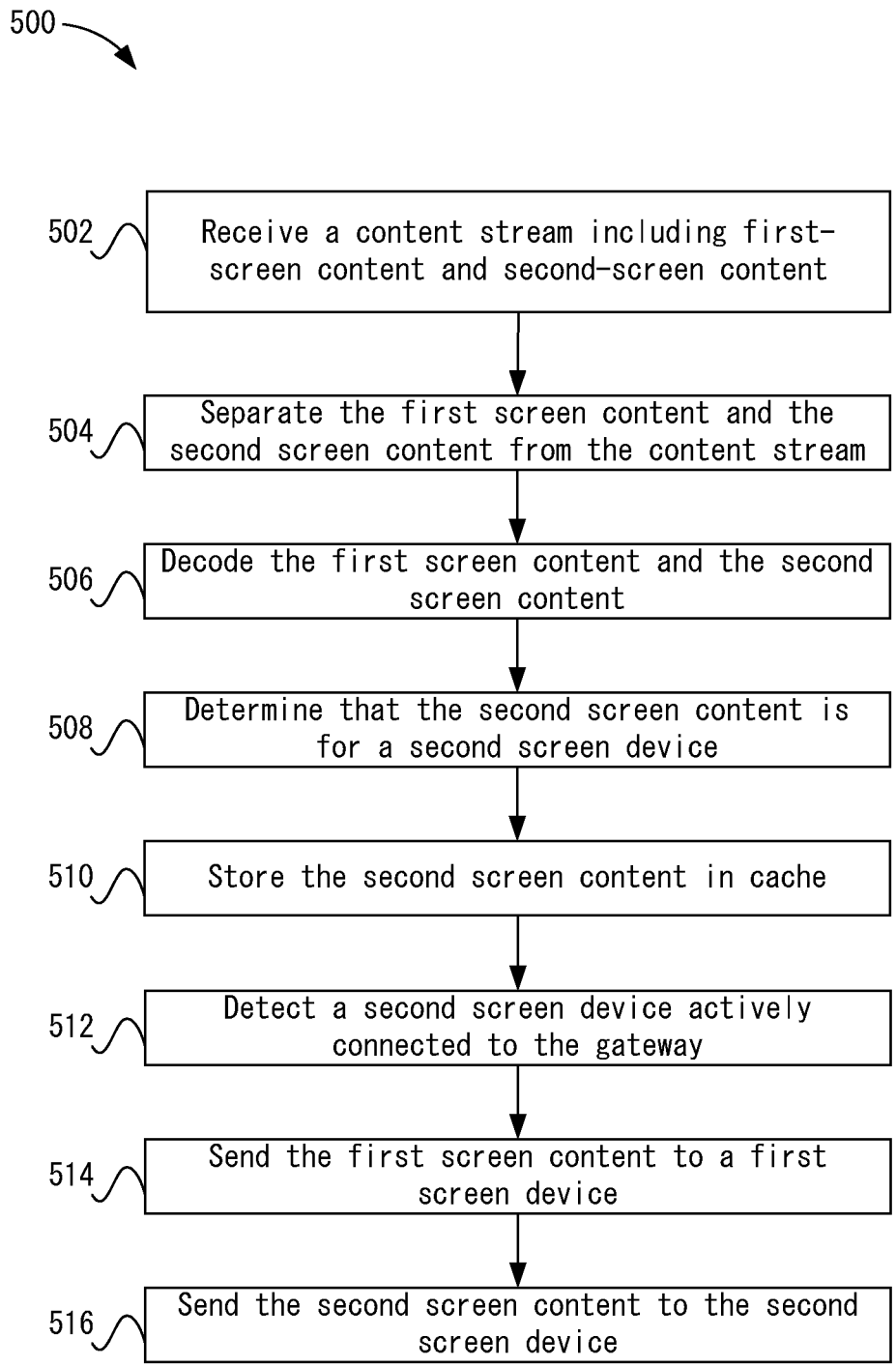
FIG. 5 depicts a simplified flowchart of a method for delivering second-screen content using MVC extensions according to one embodiment.

FIG. 5 depicts a simplified flowchart 500 of a method for delivering second-screen content using MVC extensions according to one embodiment. At 502, gateway 112 receives a content stream including first-screen content and second-screen content. Head-end 102 sent the content stream using the MVC extension configured to be used to provide multi-view content for the first-screen content.

At 504, gateway 112 separates the first-screen content and the second-screen content from the content stream. Demultiplexer 302 may be used to perform demultiplexing. At 506, gateway 112 may decode the first-screen content and the second-screen content.

At 508, gateway 112 determines that the second-screen content is for a second-screen device. At 510, gateway 112 can store the second-screen content in cache 306.

At 512, gateway 112 detects a second-screen device actively connected to the gateway. Also, gateway 112 may determine that this second-screen device is the destination for the second-screen content. Then, at 514, gateway 112 sends the first-screen content to a first-screen device. Also, at 516, gateway 112 sends the second-screen content to the second-screen device.

Computer System

Figure 6:
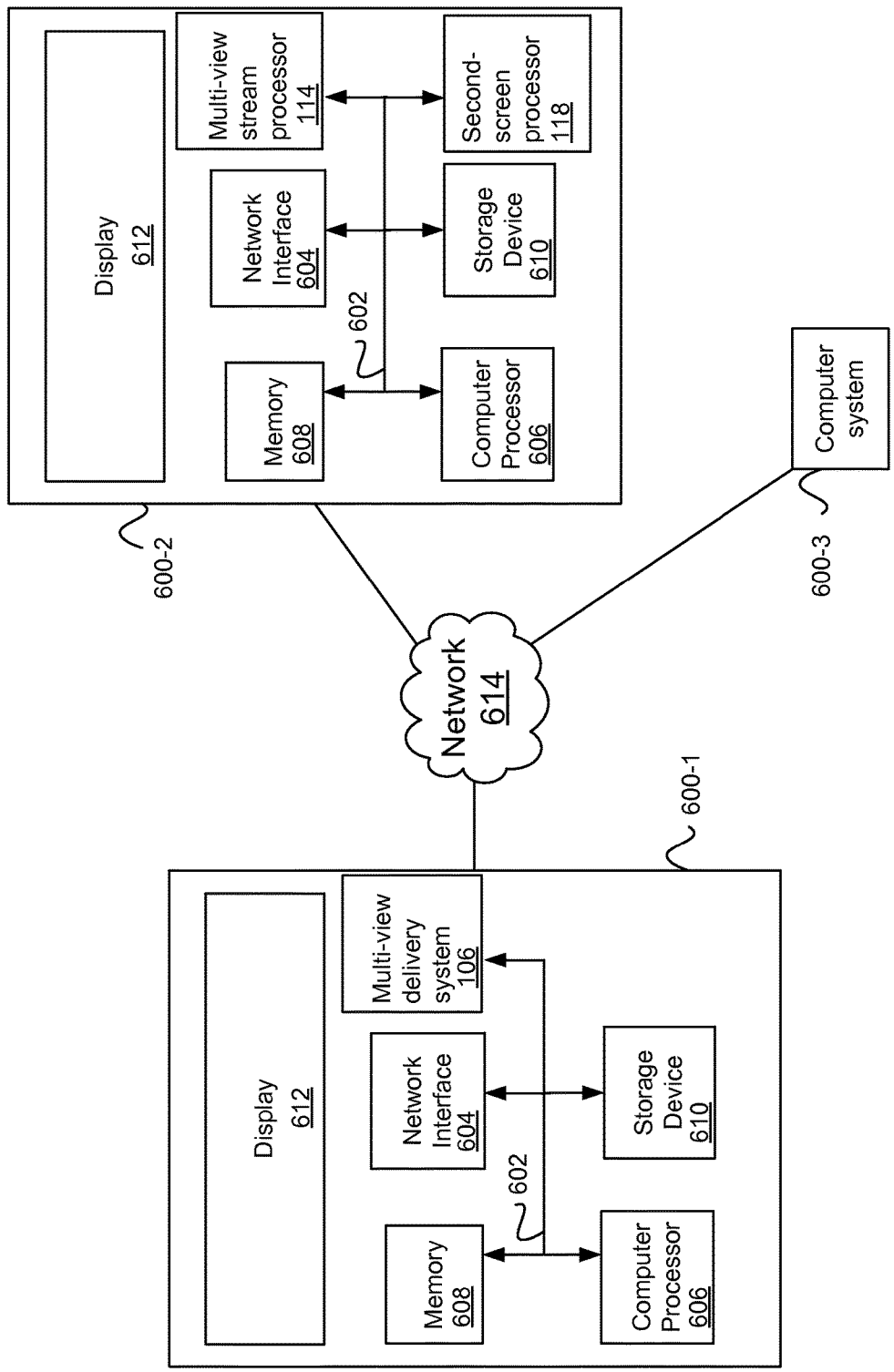
FIG. 6 illustrates an example of a special purpose computer system configured with the multi-view delivery system, the multi-view stream processor, and the second-screen processor according to one embodiment.

FIG. 6 illustrates an example of a special purpose computer system 600 configured with multi-view delivery system 106, multi-view stream processor 114, and second-screen processor 118 according to one embodiment. In one embodiment, computer system 600-1 describes head-end 102. Also, computer system 600-2 describes gateway 112. Only one instance of computer system 600 will be described for discussion purposes, but it will be recognized that computer system 600 may be implemented for other entities described above, such as multi-view delivery system 106, multi-view stream processor 114, and second-screen processor 118, first-screen devices 108, STB 116, and/or second-screen devices 110.

Computer system 600 includes a bus 602, network interface 604, a computer processor 606, a memory 608, a storage device 610, and a display 612.

Bus 602 may be a communication mechanism for communicating information. Computer processor 606 may execute computer programs stored in memory 608 or storage device 608. Any suitable programming language can be used to implement the routines of particular embodiments including C, C++, Java, assembly language, etc. Different programming techniques can be employed such as procedural or object oriented. The routines can execute on a single computer system 600 or multiple computer systems 600. Further, multiple computer processors 606 may be used.

Memory 608 may store instructions, such as source code or binary code, for performing the techniques described above. Memory 608 may also be used for storing variables or other intermediate information during execution of instructions to be executed by processor 606. Examples of memory 608 include random access memory (RAM), read only memory (ROM), or both.

Storage device 610 may also store instructions, such as source code or binary code, for performing the techniques described above. Storage device 610 may additionally store data used and manipulated by computer processor 606. For example, storage device 610 may be a database that is accessed by computer system 600. Other examples of storage device 610 include random access memory (RAM), read only memory (ROM), a hard drive, a magnetic disk, an optical disk, a CD-ROM, a DVD, a flash memory, a USB memory card, or any other medium from which a computer can read.

Memory 608 or storage device 610 may be an example of a non-transitory computer-readable storage medium for use by or in connection with computer system 600. The non-transitory computer-readable storage medium contains instructions for controlling a computer system 600 to be configured to perform functions described by particular embodiments. The instructions, when executed by one or more computer processors 606, may be configured to perform that which is described in particular embodiments.

Computer system 600 includes a display 612 for displaying information to a computer user. Display 612 may display a user interface used by a user to interact with computer system 600.

Computer system 600 also includes a network interface 604 to provide data communication connection over a network, such as a local area network (LAN) or wide area network (WAN). Wireless networks may also be used. In any such implementation, network interface 604 sends and receives electrical, electromagnetic, or optical signals that carry digital data streams representing various types of information.

Computer system 600 can send and receive information through network interface 604 across a network 614, which may be an Intranet or the Internet. Computer system 600 may interact with other computer systems 600 through network 614. In some examples, client-server communications occur through network 614. Also, implementations of particular embodiments may be distributed across computer systems 600 through network 614.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The computer system may include one or more computing devices. The instructions, when executed by one or more computer processors, may be configured to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method comprising:
   receiving, by a gateway, a content stream including first-screen content and second-screen content, the second-screen content not comprising a second view of the first-screen content, wherein the second-screen content is sent in the content stream using a multi-view coding extension configured to be used to provide multi-view content;
   separating, by the gateway, the first-screen content and the second-screen content from the content stream;
   determining, by the gateway, whether the second-screen content is for second-screen devices;
   selecting, by the gateway, a second-screen device that is connected to the gateway and is a destination for the second-screen content;
   sending, by the gateway, the first-screen content to a first-screen device; and
   sending, by the gateway, the second-screen content to the second-screen device.

2. The method of claim 1, wherein selecting the second-screen device that is connected to the gateway and the destination for the second-screen content comprises:
   selecting a plurality of second-screen devices that are connected to the gateway; and
   selecting the second-screen device from the plurality of second-screen devices as the destination for the second-screen content.

3. The method of claim 2, wherein the selecting is performed based on a user profile associated with the second-screen device.

4. The method of claim 2, wherein the selecting is performed based on the second-screen device being detected to be actively within a range of the first-screen device.

5. The method of claim 4, wherein fingerprint detection of the first-screen content is used by the second-screen device to determine the second-screen device is within the range of the first-screen device.

6. The method of claim 1, further comprising:
   communicating with the second-screen device to determine a user associated with the second-screen device is watching the first-screen content.

7. The method of claim 6, wherein communicating with the second-screen device comprises:
   communicating with an application on the second-screen device to determine the user is watching the first-screen content.

8. The method of claim 1, further comprising:
   storing the second-screen content prior to sending the second-screen content to the second-screen device.

9. The method of claim 8, further comprising:
   selecting a time to send the second-screen content to the second-screen device; and sending the second-screen content to the second-screen device at the time.

10. The method of claim 9, wherein selecting the time is based on an event occurring in the first-screen content being sent to the first-screen device.

11. The method of claim 8, further comprising:
    selecting metadata for the second-screen device to use to display the second-screen content; and
    sending the metadata and the second-screen content to the second-screen device, wherein the second-screen device uses the metadata to determine when to display the second-screen content.

12. The method of claim 1, wherein determining whether the second-screen content is for second-screen devices comprising: selecting metadata associated with the second-screen content; and
    determining whether the second-screen content should be sent to the first-screen device or the second-screen device based on the metadata.

13. The method of claim 12, wherein when the gateway determines that the second-screen content is for the first-screen device, sending the second-screen content to the first-screen device instead of the second-screen device.

14. The method of claim 1, wherein separating comprises:
    demultiplexing the content stream to determine the first-screen content and the second-screen content.

15. The method of claim 1, wherein the first-screen content and the second-screen content are sent from a single source.

16. The method of claim 1, wherein the first-screen content and the second-screen content are sent from a same network connection in a single content stream.

17. The method of claim 1, further comprising:
    decoding the first-screen content and the second-screen content at the gateway; and re-encoding, by the gateway, the first-screen content for the first-screen device and the second-screen content for the second-screen device in separate content streams.

18. An apparatus comprising: one or more computer processors; and
a non-transitory computer-readable storage medium containing instructions that, when executed, control the one or more computer processors to be configured for:
receiving a content stream including first-screen content and second-screen content, the second-screen content not comprising a second view of the first-screen content, wherein the second-screen content is sent in the content stream using a multi-view coding extension configured to be used to provide multi-view content;
separating the first-screen content and the second-screen content from the content stream; determining whether the second-screen content is for second-screen devices; selecting a second-screen device that is connected to the apparatus and is a destination for the second-screen content;
sending the first-screen content to a first-screen device; and sending the second-screen content to the second-screen device.

19. A system comprising:
a gateway device configured to be communicatively coupled, via a network, to a head-end device that comprises:
one or more first computer processors; and
a first non-transitory computer-readable storage medium comprising instructions, that when executed, control the one or more first computer processors to be configured for:

multiplexing first-screen content and second-screen content into a single content stream based on a multi-view coding extension configured to be used to provide multi-view content, wherein the second-screen content does not comprise a second view of the first-screen content, and
adding metadata to the single content stream, the metadata identifying that the second-screen content is for second-screen devices; the gateway device comprising:
one or more second computer processors; and
a second non-transitory computer-readable storage medium comprising instructions, that when executed, control the one or more second computer processors to be configured for:
receiving the single content stream including the first-screen content and the second-screen content;
separating the first-screen content and the second-screen content from the single content stream;
determining whether the second-screen content is for second-screen devices based on the metadata;
sending the first-screen content to a first-screen device; and sending the second-screen content to a second-screen device.

20. The system of claim 19, wherein the gateway device is further configured to be communicatively coupled to a plurality of second-screen devices, and wherein the gateway device is further configured to select, from the plurality of second-screen devices, the second screen device to which to send the second-screen content.

\* \* \* \* \*